F. A. KRUSEMARK.
MOLD FOR MAKING CUSHION TIRES.
APPLICATION FILED DEC. 13, 1920.
1,408,100.
Patented Feb. 28, 1922.
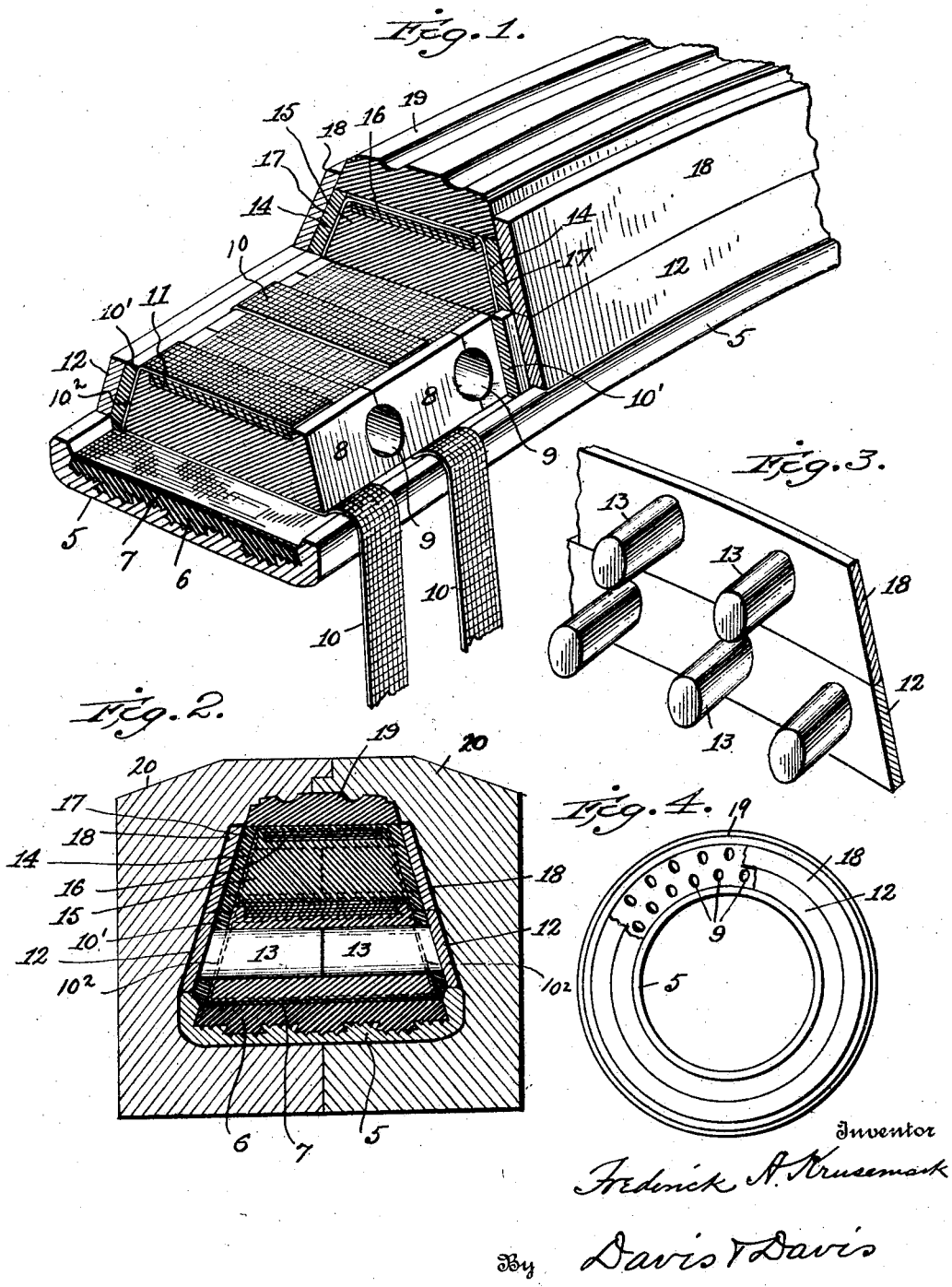

UNITED STATES PATENT OFFICE.

FREDERICK A. KRUSEMARK, OF ROANOKE, VIRGINIA, ASSIGNOR TO K. F. & C. TIRE & RUBBER CORPORATION, OF ROANOKE, VIRGINIA, A CORPORATION OF VIRGINIA.

MOLD FOR MAKING CUSHION TIRES.

1,408,100.  Specification of Letters Patent.  Patented Feb. 28, 1922.

Application filed December 13, 1920. Serial No. 430,437.

*To all whom it may concern:*

Be it known that I, FREDERICK A. KRUSEMARK, a citizen of the United States of America, and a resident of Roanoke, county of Roanoke, and State of Virginia, have invented certain new and useful Improvements in Molds for Making Cushion Tires, of which the following is a full and clear specification.

This invention relates to that class of cushion tires in which there is formed one or more series of transverse passages for the purpose of increasing resiliency and ventilation, and in which there is embedded one or more series of circumferential cord-bands; and the object of this invention is to improve and simplify the manufacture of this type of tire, to the end that the resultant tire will not only be more durable and lively but can be manufactured at a much reduced cost, as more fully hereinafter set forth.

I have shown my new mold as applied to the manufacture of that type of tire covered by my copending application filed herewith and serially numbered 430,438.

In the drawing—

Fig. 1 is a sectional perspective view showing the tire in the course of building;

Fig. 2 is a transverse sectional view showing the tire completed, in the mold, ready for vulcanization;

Fig. 3 is a detail perspective view of segments of the two rings carrying the core-pins;

Fig. 4 is a side elevation of the tire just prior to insertion in the mold, the two rings being broken away to show the two series of holes formed in the completed tire.

In the drawing annexed, 5 represents the usual tire-rim between whose flanges in embedded the usual hard rubber tire mass 6. Upon this hard rubber mass 6, one or more cord-fabric bands 7 may be wrapped, but these are not essential in this type of tire. Upon this circumferential band 7 or directly on the rubber 6 is placed a series of transverse bands 10 of cord-fabric of the usual kind, consisting of closely-spaced cords running longitudinally of the strip and held together, as usual with this type of fabric, by light cross-threads. When these bands are first laid across the rubber mass 6, the ends are allowed to hang down over the edges of the rim. The usual tackiness of the bands holds them in place on the tire-base-mass 6. These bands 10 are equally spaced apart around the tire. Then what might be called the first layer or zone of the tire is put in place, this being done preferably by a series of blocks of rubber 8 extending nearly across the rim and having their side edges stuck together and their bottom faces stuck to the fabric-strips 10 and the hard mass 6 (or fabric 7, if this be used) sufficiently tight to hold the blocks in place as they are built up on the tire in circumferential progression. After this layer of rubber blocks is put in position, another series of transverse bands 14, like bands 10, is put in place, this second series alternating with series 10 all the way around the tire, their loose ends being allowed to hang down over the edges of the rim, as with bands 10, while they are being positioned progressively around the tire. After the transverse bands are thus placed around the tire, their dangling end-portions are then folded over temporarily upon the blocks, the series 10 being stuck to the ends of blocks 8; then the side faces of the inner zone of the tire are built out to come even with the flanges of the rim by sticking pieces of rubber 10' along the side walls against the radial parts $10^2$ of the bands 10, these radial parts $10^2$ being substantially parallel with the outer, inclined, side faces of the tire. Then a metal mold-ring 12 is placed on the rim of the tire, substantially in the manner disclosed in my aforesaid application filed herewith and serially numbered 430,438, these rings being each provided with a series of core-pins 13 which form the holes 9 in the tire, the pins extending inwardly about half way through the tire mass so as to meet approximately in the center thereof, so that the resultant holes will extend entirely through the tire mass when the tire is finished. To facilitate the forming of these holes 9, the blocks 8 are grooved along their edges before they are placed on the tire-rim, and the pins on the mold-rings are inserted in these roughly-formed holes.

After the mold-rings 12 carrying the inner series of pins are thus put in place on the rim-flanges, and the loose ends of bands 10 and 14 are thrown outwardly so as to hang loosely over the edges of the rings, a series of circumferential fabric-bands 11 is wrapped, under high tension, around the blocks 8 and the bands 14; and then the loose end-portions of the first series of transverse bands 8 are folded over upon the bands 11 in overlapped relation. Then another series of blocks 15, similar to the blocks 8, is put in place upon the tightly-drawn circumferential bands 11 and upon the overlapped end-portions of the bands 8; then a series of facing pieces 17, similar to the pieces 10', is put in place against the radial parts of the band-loops 14; then another pair of metal rings 18 carrying core-pins 13 is put in place on the edges of the previously-positioned pin-carrying rings 12; then another series of circumferential bands 16 is wrapped, under high tension, around the second or outer zone of the tire as formed by the blocks 15; then the dangling end-portions of the bands 14 are folded over upon said circumferential bands in contact therewith so as to be united under the subsequent vulcanization; then the tread-rubber 19 is put in place, and the tire is ready for vulcanization in the usual manner by being enclosed in a mold and subjected to heat, the mold being, of course, so proportioned with respect to the tire mass as to compress the same during vulcanization. When the mold is opened, the metal rings carrying each series of half-length core-pins are readily removed, whereupon the tire is ready for use, except that it of course requires the usual finishing treatment.

The tire thus produced possesses the advantages set forth in my aforesaid copending application. The advantage in employing core-pins of half length and in mounting each set of half-length pins on a ring enables these core-pins to be handled with ease and expedition, they being insertable as a whole and being removable from the completed tire as a whole, thereby avoiding the delay and trouble of inserting and removing them as individual units. This method also ensures exactness in spacing the holes around the tire, and, furthermore, the base-rings 12 serve to assist in holding the inner zone of blocks solidly in place while the remainder of the tire is built up.

It will be understood that the order of the steps in building up the tire and placing the rings may be varied without departing from the spirit of my invention. For instance, instead of first laying in place the series of abutting blocks on the base, I may first place the core-carrying rings on the base portion of the tire, whether pressed-on or demountable, with the half-length core-pins in contact or nearly in contact, and then squeeze the rubber blocks into the spaces between the pins, and then the remainder of the tire carcass may be built up in the same way. It will be understood that in either case the adjoining ends of the half-length core-pins are not abutted but are slightly agap to allow for building space and also compression when clamped in the mold. The advantage in manipulating the core-pins as a whole rather than singly will be obvious when it is remembered that there are a large number—in some cases as many as 100—pins on each ring. A further advantage in mounting the pins on rings is that I thereby avoid forming films of rubber over the outside ends of the passages when the tire is cured in the mold.

It will be understood that the first or inner series of bands 8 is staggered with reference to the holes 9, so that when each band is folded over in the manner set forth, it envelopes a solid mass of rubber and also a short portion of the length of the circumferential fabrics 11, to which latter it is united by the subsequent vulcanization treatment; and it will be seen also that the outer series of bands 14 alternate with the inner series of bands 8 so that they will each be located radially in line with one of the openings 9. It will be understood that it is not absolutely necessary that the bands 10 and 14 shall encompass the circumferential bands, as they may be simply wrapped around each rubber member before it is inserted in place in building up the tire, as shown in my aforesaid copending application.

I have described the method of making this tire that is disclosed in my aforesaid copending application, but it will be understood that it may be built up in accordance with any other desirable method without departing from the spirit of my invention. It will be observed also that the holes 9 are elliptical in cross-section, the major diameter being radial. The object of this is to dissipate or prevent localization of action in the rubber mass which forms the wall of the opening. It will be observed that when subjected to load pressure, the openings will have a tendency to become circular, in which formation there will be less danger of excessive action in the rubber mass forming the wall of the opening. If any other shaped opening were used, an excessive load would cause less equal distribution of strains in the wall of the opening and thus greatly increase the danger of chafing and pinching on lines across the tire. It is well known that, should the wall of the opening be pinched or subjected to abnormal pressure, the portion thus subjected will soon deteriorate and lose its elasticity and the resultant chafing will cut through the rubber members.

It will be observed that the cord-fabric loops 10 and 14 serve to restrain lateral expansion in the rubber mass under load and thus ensure a quicker reaction and consequently a more lively tire. Thus restraining the lateral expansion under load also tends to prevent separation of the circumferential bands from the tire mass, this being due to the fact that when the tire mass is under load, excessive lateral expansion would tend to separate the rubber mass from the fabric bands, since these bands have very little edgewise elasticity. The cord-loops also bind the rubber mass and circumferential bands together and thus help to take care of lateral as well as traction strains and also to anchor the tire proper more firmly to the base.

The nature and scope of the invention having been thus indicated and its preferred embodiment having been specifically described, what is claimed as new is:

1. A mold for cushion tires consisting of two sections, each section having its mold-cavity annularly grooved along the side wall, a pair of rings superposed upon each other and fitted in each of said grooves, each ring carrying a series of inwardly-extending half-length core-pins, for the purpose set forth.

2. A mold for cushion tires having a removable ring set against each side wall of the tire cavity, each ring carrying a series of core-pins extending into the cavity.

3. A mold for cushion tires having a pair of metal rings set in each side wall of the tire cavity and being removable therefrom, each ring carrying a series of inwardly-extending core-pins.

4. A mold for cushion tires having a removable rim set against each side wall of the mold, each ring carrying a series of inwardly-extending half-length core-pins, the pins in one ring meeting the pins in the other ring to complete the full-length core-pins.

5. A mold for cushion tires having a pair of removable rings set against the side walls of the mold, one ring being larger in diameter than the other and each ring carrying a series of inwardly-extending half-length core-pins, the pins of one ring meeting the corresponding pins of the opposite ring to thereby complete the full-length core-pins.

In testimony whereof I hereunto affix my signature.

FREDERICK A. KRUSEMARK.